US007793076B1

(12) United States Patent
Vavro et al.

(10) Patent No.: US 7,793,076 B1
(45) Date of Patent: Sep. 7, 2010

(54) DIGITAL SIGNALS PROCESSOR HAVING A PLURALITY OF INDEPENDENT DEDICATED PROCESSORS

(75) Inventors: David K. Vavro, Chandler, AZ (US); James A. Mitchell, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/465,634

(22) Filed: Dec. 17, 1999

(51) Int. Cl.
*G06F 9/00* (2006.01)
(52) U.S. Cl. .......................................... 712/31; 712/225
(58) Field of Classification Search .................. 712/35, 712/228, 31, 225; 711/147–153; 710/5
See application file for complete search history.

(56) References Cited

U.S. PATENT DOCUMENTS

| | | | | |
|---|---|---|---|---|
| 4,745,544 | A | * | 5/1988 | Renner et al. ................. 712/11 |
| 5,083,204 | A | | 1/1992 | Heard et al. |
| 5,197,140 | A | * | 3/1993 | Balmer ........................ 711/220 |
| 5,241,679 | A | * | 8/1993 | Nakagawa et al. ........... 712/228 |
| 5,742,840 | A | * | 4/1998 | Hansen et al. ................ 712/36 |
| 5,968,167 | A | * | 10/1999 | Whittaker et al. ............ 712/225 |
| 6,397,321 | B1 | * | 5/2002 | Yamamoto et al. ............ 712/35 |

FOREIGN PATENT DOCUMENTS

| | | |
|---|---|---|
| EP | 0 667 582 | 8/1995 |
| EP | 0 834 816 | 4/1998 |
| EP | 0 942 603 | 9/1999 |
| JP | 62-168260 | 7/1987 |

OTHER PUBLICATIONS

Hennessy and Patterson, Computer Acrhitecture: A Quantative approach, Morgan Kaufmann Publishers, Inc., second edition, pp. 278-279.*
Microsoft Computer Dictionary, 1999, Microsoft Press, fourth edition, p. 395.*
Khan M. S. et al: *A Standardized interface Control Unit for Heterogenous Digital Signal Processors*, Intl. Symposium on Circuits and Systems (ISCAS), Digital Signal Processing (DSP), London, May 30-Jun. 2, 1994, New York, IEEE, US. vol. 2, May 30, 1994, pp. 97-100.
Dutta S. et al., *Architecture and Design of a Talisman-Compatible Multimedia Processor*, IEEE Transactions on Circuits and Systems for Video Technology, IEEE Inc. New York, US, vol. 9, No. 4, Jun. 1999, pp. 565-578.

* cited by examiner

*Primary Examiner*—Niketa I Patel
*Assistant Examiner*—Benjamin P Geib
(74) *Attorney, Agent, or Firm*—Trop, Pruner & Hu, P.C.

(57) ABSTRACT

A digital signal processor uses a number of independent sub-processors that may be controlled by a master programmable controller. For example, a specialized input processor may process input signals while a specialized output processor may process output signals. Each of these processors may also accomplish math functions when input and output processing is not necessary. The various processors may communicate with one another through general purpose registers which receive data and provide data to any of the processors in the system. Math processors may be added as needed to accomplish desired mathematical functions. In addition, a RAM processor may be utilized to hold the results of intermediate calculations in one embodiment of the present invention. In this way, an adaptable and scaleable design may be implemented that accommodates a variety of different operations without requiring redesign of all the components.

26 Claims, 8 Drawing Sheets

US 7,793,076 B1

DIGITAL SIGNALS PROCESSOR HAVING A PLURALITY OF INDEPENDENT DEDICATED PROCESSORS

BACKGROUND

This invention relates generally to digital signal processing and in particular aspects to architectures for digital signal processors.

Digital signal processors generally modify or analyze information measured as discrete sequences of numbers. Digital signal processors are used for a wide variety of signal processing applications such as television, multimedia, audio, digital image processing and telephony as examples. Most of these applications involve a certain amount of mathematical manipulation, usually multiplying and adding signals.

A large number of digital signal processors are available from a large number of vendors. Generally, each of these processors is fixed in the sense that it comes with certain capabilities. Users attempt to acquire those processors which best fit their needs and budget. However, the user's ability to modify the overall architecture of the digital signal processor is relatively limited. Thus, these products are packaged as units having fixed and immutable sets of capabilities.

In a number of cases, it would be desirable to have the ability to create a digital signal processor that performs complex functions that are specifically adapted to particular problems to be solved. Thus, it would be desirable that the hardware and software of the digital signal processor be adapted to a particular function. However, such a digital signal processor might enjoy a relatively limited market. Given the investment in silicon processing, it may not be feasible to provide a digital signal processor which has been designed to meet relatively specific needs. However, such a device would be highly desirable. It would provide the greatest performance for the expense incurred, since only those features that are needed are provided. Moreover, those features may be provided that result in the highest performance without unduly increasing cost.

Thus, there is a need for digital signal processor which is scalable, and adaptable to implementing a variety of unique applications in various configurations.

SUMMARY

In accordance with one aspect, a digital signal processor includes a mathematical processor, an input processor and an output processor. The input processor processes input signals to the digital signal processor. The output processor processes output signals from the digital signal processor. A master processor controls the mathematical processor, the input processor and the output processor. A storage is selectively accessible by each of the processors.

Other aspects are set forth in the accompanying detailed description and claims.

DETAILED DESCRIPTION

Figure 1:
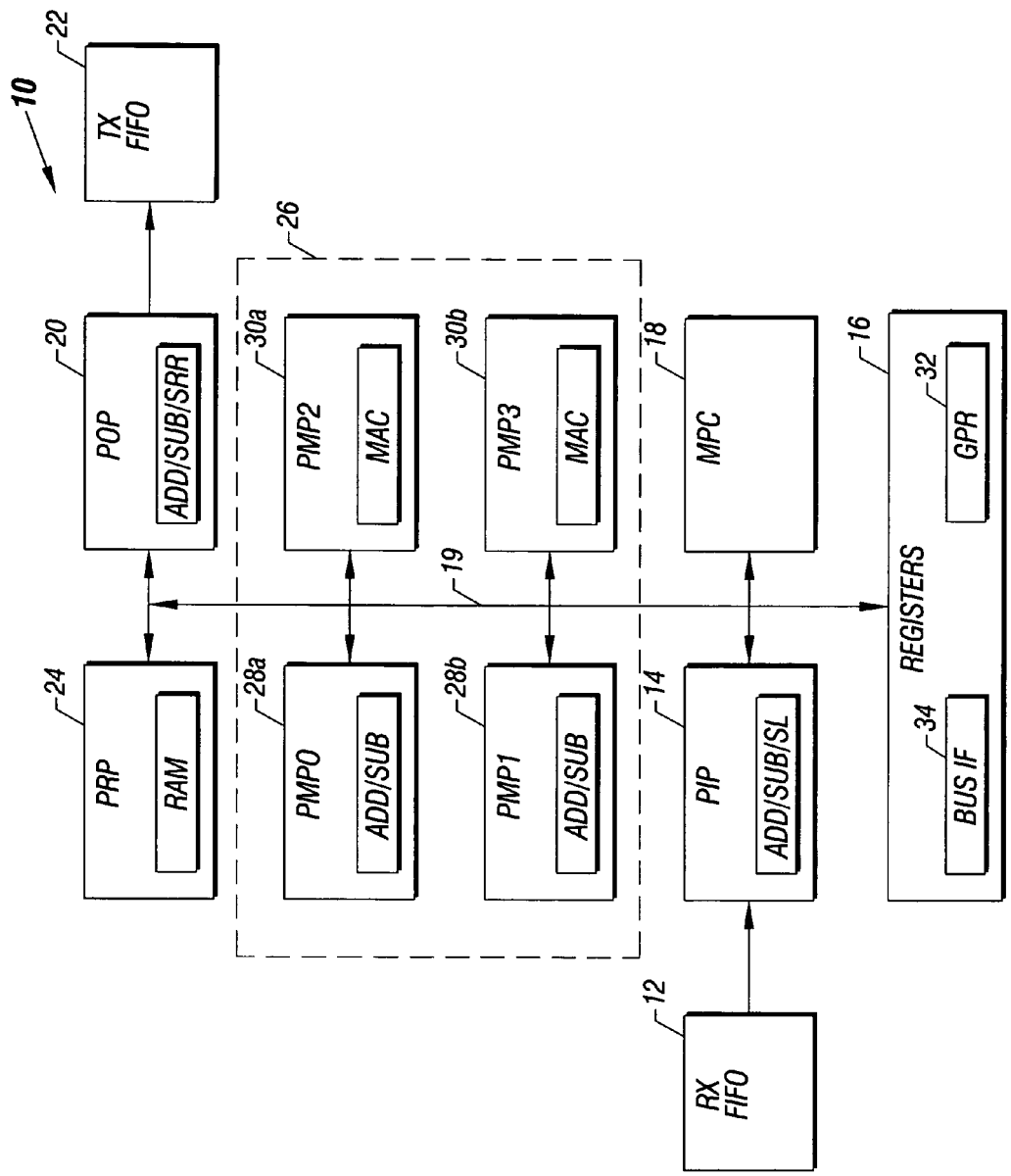
FIG. 1 is a block diagram of one embodiment of the present invention.

A digital signal processor 10 may include a plurality of microprocessors 14, 18, 20, 24 and 26 each having their own instruction sets. The individual processors need not communicate directly with one another but instead may communicate through storage registers associated with a general purpose register (GPR) 32 that is part of the registers 16. Thus, the results of an operation performed by one of the processors may be stored in the GPR 32 for access by another processor.

Each of the processors may be separately programmed with its own set of codes. The instruction sets for each processor may provide the logic for operating the particular functions for that processor, avoiding the need for separate hardware logic for implementing the subprocessor functions, in one embodiment of the invention.

The master programmable controller (MPC) 18 provides the timing for the other processors and operates like an instruction execution controller. Knowing the times to execute a given instruction in a given processor, the MPC 18 waits for response from a given processor. In effect then the MPC 18 has instruction sets that enable it to assist others to operate on a cycle by cycle basis. Generally, one instruction is executed per cycle.

Although each of the processors may be independently programmed, the instruction sets may be sufficiently similar so that an instruction set for one processor may be modified for use in other processors. This may decrease the time for programming each processor.

A programmable input processor (PIP) 14 receives inputs from a receive buffer such as a first in first out (FIFO) register 12. The PIP 14 may, in some embodiments of the present invention, provide a precision change or a scaling of an input signal. The PIP 14 may be advantageous since it may provide for input data processing when input signals are available and may provide mathematical operations at other times. The input data need not be synchronized with the system 10 since the MPC 18 may wait for the PIP 14 to complete a given operation. Thus, in effect, the MPC 18 provides the synchronization for a variety of unsynchronized subprocessor units.

The programmable output processor (POP) 20 provides outputs to a transmit buffer 22 such as a first in first out (FIFO) register. The POP 20 may also do mathematical operations when no output data is available for transmission to the transmit buffer 22.

The programmable random access memory (RAM) processor (PRP) 24 basically stores and retrieves data. It may be particularly advantageous in storing intermediate results, in a cache-like fashion. This may be particularly applicable in two-dimensional image processing.

Some embodiments of the present invention may use normal length words but other embodiments may use the so-called very long instruction word (VLIW). VLIW may be advantageous in some embodiments because the logic may be in effect contained within the instructions and glue logic to coordinate the various subprocessors may be unnecessary.

Since each instruction may have a predetermined execution time independent of the data, the MPC 18 can control the various processor operations, on a cycle-by-cycle basis. Each of the processors is capable of operating in parallel with all of the other processors. Thus, in effect, the architecture shown in FIG. 1 is a parallel processor; however, the architecture is such that the operations are largely broken down on general recurring functional bases.

A number of mathematical processors may be provided within the unit 26 based on the particular needs in particular applications. In the illustrated embodiment, a pair of identical add and subtract programmable mathematical processors (PMP) 28a and 28b are combined with a pair of multiply and accumulate (MAC) programmable mathematical processors (PMP) 30a and 30b. However, a variety of other mathematical processors may be plugged into the digital signal processor 10 in addition to or in place of any of them or all of the illustrated PMPs.

Each of the processors 14, 18, 20, 24, 28 and 30 may be programmable, contain its own random access memory and decode the random access memory contents into instructions, in one embodiment of the invention. The control of the programmable processors is accomplished by the MPC 18. It controls when a given instruction is executed by any of the programmable processors.

Thus, the MPC 18 controls the time of execution of instructions and is the only provider of instructions that are clock cycle active. The remaining programmable processors run at the same time.

The register module 16 contains general purpose registers for storing data and allowing the accessing of data by the programmable processors. The inclusion of a programmable random access memory processor 24, programmable input processor 14 and the programmable output processor 20 allows very flexible input, output and data manipulation/storage operations to take place in parallel with mathematical operations.

MPC 18

Figure 2:
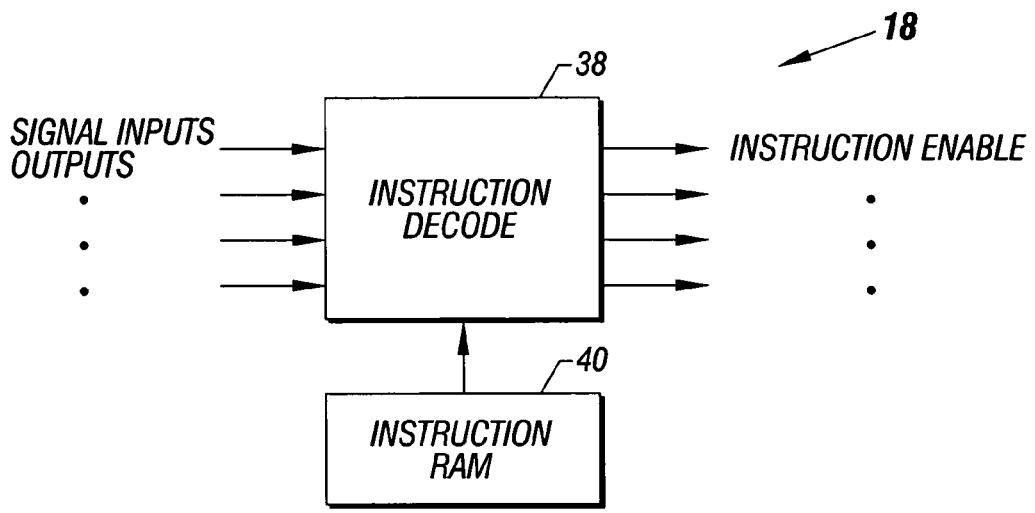
FIG. 2 is a block diagram for one embodiment of the master program controller illustrated in FIG. 1.

The MPC 18 controls the processors 14, 20, 24, 28 and 30 that may be considered as slave processors to the MPC 18. Thus, the MPC 18 contains an instruction memory 40 and an instruction decode 38, as indicated in FIG. 2. The MPC 18 determines when a slave processor can execute instructions and the slave processors communicate when data reads or writes to the external data bus 19 have completed. The MPC 18 is also responsible for generating cycle dependent or instruction dependent signals. Examples of such signals include interrupts, data tags and the like.

In some embodiments of the present invention, the MPC 18 may be the only processor concerned with the slave processor timing. The MPC 18 may have the ability to meter control signals and globally affect the slave processors based on the state of those metered signals. The MPC 18 may also control when the processors execute a given instruction. This module is clock cycle accurate and may be used to control the parallel operation of an embodiment using VLIW. The MPC 18 contains instruction enables for each of the other processors.

These instruction enables are used to control when the slave processor processes its next instruction. Null operations are performed by not issuing an enable during a particular clock cycle.

The MPC 18 may decode the following instruction types in one embodiment of the invention:

ENABLE Instruction for independent control enable of all slave processors.

RESET_PC Instruction for resetting the program counter for each slave processor's instruction memory.

WAITONX Instruction used to synchronize the MPC and all of its slave processors to external data from the PIP and POP.

REPEAT_N Instruction provides two types of repeat branches. REPEAT N times or REPEAT forever.

JUMP_IF Instruction is a jump conditional instruction.

JUMPN Instruction provides three types of jump branches. JUMP N times, JUMP forever and JUMP RETURN for function calls.

RETURN Instruction resets the program counter back to the JUMP RETURN instruction plus one. This may be used for function calls.

In one embodiment of the present invention, the instruction decode may be implemented using the following table (with the number of bits per instruction shown in parentheses):

| ITYPE | Note | MSB to LSB BIT MAP |
| --- | --- | --- |
| 000 | Enable | USR_DEF(4)&TAG 1,0(2)&PIP(1)&POP(1)& PRP(1)&PMP3,2,1,0(4)&ITYPE (3) |
| 001 | Reset pc | RMPC(1)&RPIP(1)&RPOP(1)&RPRP(1)& RPMP0_3(4)&ITYPE(3) |
| 010 | Wait on x | WAIT_POP(1)&WAIT_PIP(1)&ITYPE(3) |
| 011 | Repeat N | REPEAT_N(5)&ITYPE(3) |
| 100 | Jump if | TAG(2)&INSTR_ADDR(9)&ITYPE(3) |
| 101 | JumpN | JUMP_CNT(4)&INSTR_ADDR(9)&ITYPE(3) |
| 110 | Return | ITYPE(3) |
| 111 | Stop | STOP_DEBUG(1)&STOP_EN(1)&ITYPE(3) |

In the above instruction decode table, USR_DEF provides spare outputs, an example of which might be an interrupt. These outputs are registered and one set remains set until reset by the same instruction. TAG is used to generate tags for the transmit FIFO register 22. The tags can be used for items such as cyclical data. An example of cyclical data is RGB pixels in an image processing application. These outputs are registered and once set, remain set until reset by the same instruction.

PIP, POP, PRP, PMP0-3 are bits that when set to one enable the execution of an instruction for each of the slave processors. ITYPE is the instruction type as defined in the above instruction decode table. RMPC, RPIP, RPOP, RPRP, RPMP0-3 are bits that when set to one reset the corresponding program counter for the respective processor. The program counter is used to keep track of the current location of the instruction being executed by each processor.

WAIT_POP and WAIT_PIP cause the MPC 18 to wait until a one is detected from a corresponding POP or PIP slave processor. This function can be used to trigger up a block of data to be operated on or to send out a block of data. REPEAT_N is a value that causes the last instruction to be repeated N+1 times. A zero is equal to repeat once, a one is equal to repeat twice and so on. If REPEAT_N equals a maximum, then a REPEAT forever will occur. The maximum is defined as the maximum value that can be used in a field (e.g. REPEAT_N (5) equals "11111" or 31 decimal). A repeat instruction does not cost a clock cycle to execute.

The JUMP_IF instruction operates in the following fashion. In a first step, the first encounter of a JUMP_IF instruction arms a comparator. In a second step, the second encounter of a JUMP_IF instruction identical to the previous one causes a jump to an address if the comparator has detected a match of the tag as armed in the first step. After the jump, the JUMP_IF is dearmed. In a third step, any second encounter of a JUMP_IF instruction with a different tag than in the first step, changes the comparator and rearms the JUMP_IF instruction.

INST_ADDR is a jump to an instruction address. The jump instruction generally takes one cycle. JUMP_CNT is the number of times to jump to the INST_ADDR. For example, zero equals one jump, one equals to two jumps, etc. If JUMP_CNT is a maximum then a JUMP forever may occur. If the JUMP_CNT is equal to a maximum minus one, then the JUMP_RETURN may occur.

A STOP_EN is a bit that when set to one stops the MPC 18 until a reset or until the unit is turned from off to on. When changing from the off state to the on state, the MPC 18 may be reset to the first instruction. A STOP_DEBUG indicates that the MPC 18 will stop until a toggle from the off state to the on state occurs. At this point, operation resumes at the next instruction. This mode may be used for debugging. All the processors can be stopped and then all the contents of the registers 32 or the processor RAMs may be read.

The MPC 18 provides a single central master processor to control the operation of the slave processors. This allows easier portability across different process technologies used to make the various processors. As the slave processors are added, removed, modified or redesigned to meet timing with different throughputs, only the master processor program may change. This avoids the need to completely redesign the entire digital signal processor 10. With an instruction assembler that generates the machine code for the master control processor, this process may be relatively fast and easy. Easy generation of cycle accurate or program dependent signals may be accomplished with the MPC 18. Slave processors may be removed or added with ease allowing the creation of custom digital signal processors with different performances.

PIP 14

Figure 3:
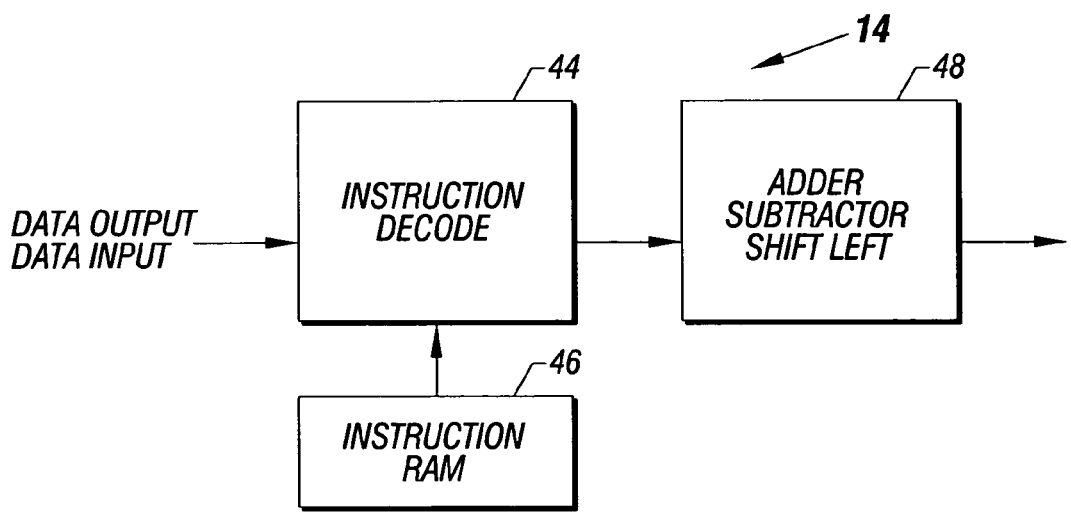
FIG. 3 is a block diagram for one embodiment of the programmable input processor shown in FIG. 1.

As shown in FIG. 3, the PIP 14 includes an instruction memory 46, an instruction decoder 44 and a math capability 48. The PIP 14 is capable of implementing addition, subtraction and shift left functions on the input data as well as internal data in accordance with one embodiment of the present invention. The MPC 18 controls the execution of instructions by the PIP 14. The PIP 14 signals the MPC 18 when input data reads are complete. The PIP 14 uses self-timed math modules to execute instructions and math functions.

The PIP 14 may send incoming data from a receive FIFO register 12 into the GPR 32. The PIP 14 has the ability to add a full signed 16-bit offset and scale up by shifting left the incoming or internal data. The PIP 14 also has overflow and underflow error flags that can be used by other entities to determine what to do with the data. When operating on internal data, the PIP 14 may read or write data from any GPR 32 register and this mode is clock cycle accurate.

When operating on data from the input FIFO register 12, the PIP 14 may write data to any GPR 32 register. The PIP 14 interfaces with the receive FIFO register 12 with a busy/valid protocol. An instruction done signal may be sent to the MPC 18 whenever the receive FIFO register 12 instruction is completed.

The PIP 14 may also set up register chains in the GPR 32. For example, in the chain mode, data written into a register zero does not destroy data in the register zero. Instead the data from the register zero is automatically written to a register one and data from the register one is automatically written to the register two and so on until the end of chain (EOC) is reached. Thus, the register zero is now defined as the start of chain (SOC) because the PIP 14 is writing to register zero. This may all happen in one clock cycle, allowing fast sliding filter operations in both one and two dimensions.

If a global EOC bit is set equal to one, then any write to the GPR 32 may define a valid SOC. If the global EOC is set to zero, only PIP 14 writes to the GPR 32 are defined as a valid SOC. The global EOC mode may be used in Infinite Impulse Response (IIR) filter applications.

The PIP 14 may decode the following instruction types in one embodiment of the invention:

RXFIFO Instruction used to get data from an external source.
INTERNAL Instruction used for routing of data from an external or internal source.
OFFSET Instruction that can add an offset to incoming data.
SHIFTLEFT Instruction can shift left incoming data bits.
EOC Instruction used for global chaining to tell where the end of the chain is located.
REPEATN Instruction provides two types of repeat branches—REPEAT N times or REPEAT forever.
JUMP_IF Instruction is a jump conditional instruction.
JUMP_N Instruction provides three types of jump branches, JUMP N times, JUMP forever and JUMP RETURN for functional calls.
RETURN Instruction resets the program counter back to the jump return instruction plus one.

The following instruction decode table may be used in one embodiment of the present invention:

| ITYPE | Note | MSB to LSB BIT MAP |
|---|---|---|
| 0000 | Rx fifo | QUANTY(5)&DEST(5)&ITYPE(4) |
| 0001 | internal | SUBEN(1)&DEST(6)&SOURCE_B(6)& SOURCE_A(6)&ITYPE(4) |
| 0010 | Offset | OFFSET(16)&ITYPE(4) |
| 0011 | Shift left | SHIFT_L(4)&ITYPE(4) |
| 0100 | Eoc | GLOBAL_EOC(1)&EOC(5)&ITYPE(4) |
| 0101 | Repeat N | REPEAT_N(5)&ITYPE(4) |
| 0110 | JumpN | JUMP_CNT(6)&INST_ADDR(7)&ITYPE(4) |
| 0111 | Return | ITYPE(4) |
| 1000-1111 | Reserved | |

QUANTY is a counter that controls the number of words fetched from the incoming data source. If set to zero, one word is fetched, if set to one, two words at fetched and so on. Upon completion of the total amount to be fetched, the PIP 14 signals the MPC 18 that the instruction has been executed. This instruction stays asserted until the next instruction is enabled.

DEST is the destination address to the GPR. ITYPE is the instruction type as defined in the instruction decode table. SUBEN is a bit that when set equal to one enables a subtraction as follows: DEST=SOURCE_A−SOURCE_B. When set to zero, SUBEN enables an addition as follows: DEST=SOURCE_A+SOURCE_B. SOURCE_A is the address of the A input to the adder/subtractor. SOURCE_B is the address of the B input to the adder/subtractor.

An OFFSET is the amount in signed format added to the input data as follows: DEST_GRP=input data+offset. Subtraction occurs if the value is negative. SHIFT_L is the amount of shifts left performed on the input data. Decoding may be as follows: 0000 means no left shifts, 0001 means one left shift, . . . , 1000-1111 means eight left shifts.

GLOBAL_EOC is a bit that when set to one enables the global EOC mode. In this mode, the processors that write to the GPR zero register will be considered the SOC. When this mode is not active, only the PIP 14 writes to the GPR define the SOC. EOC is the end of chain address for the GPR. The SOC is always defined as the DEST_GPR or DEST if it addresses the GPR. If the EOC is 000000 then no chaining of the GPR occurs. When the EOC is less than or equal to the SOC, no chaining occurs. When the EOC is greater than the SOC, then register chaining occurs.

REPEAT_N, JUMP_CNT, INST_ADDR and RETURN are all as defined for the MPC 18.

Through the use of the PIP 14, data may be transferred from working registers in a programmable fashion. Data input and other slave operations may occur independently of each other. The PIP 14 allows writing data to a destination that may not be ready for data. While not performing data transfers, the PIP 14 can be used to perform internal math functions.

POP 20

Figure 4:
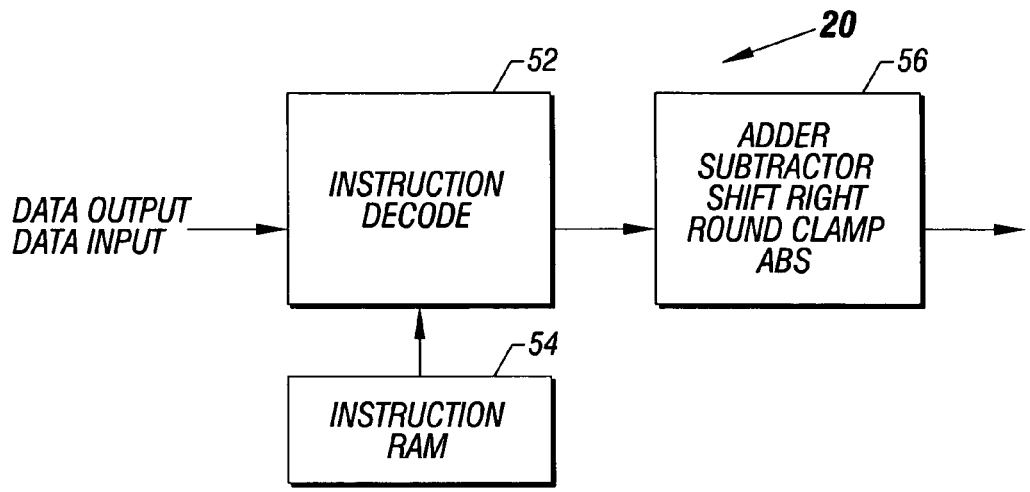
FIG. 4 is a block diagram for one embodiment of the programmable output processor shown in FIG. 1.

The POP 20 has an instruction memory 54, an instruction decode 52 and a math unit 56 as shown in FIG. 4. The POP 20 is capable of implementing addition, subtraction, shift right, ceiling, flooring, absolute value and round functions on internal data in accordance with one embodiment of the present invention. The POP 20 also has overflow and underflow flags. The MPC 18 controls the execution of instructions by the POP 20. The POP 20 signals to the MPC 18 when output data writes are complete. The POP 20 uses self-timed math modules to execute instructions and math functions.

The POP 20 is responsible for sending data to the transmit buffer 22 from any of the GPR 16 registers while in the transmit data mode of operation. While in the internal mode, the POP 20 may send and receive data from any of the GPR 16 registers. The internal mode of operation occurs when the POP is not sending data to the transmit FIFO register 22.

The transmit data mode of operation may not be clock cycle accurate where the internal mode of operation may be clock cycle accurate. Transfers to the transmit FIFO register 22 may not be clock cycle accurate because the register 22 may be full. However, the POP 20 can signal the MPC 18 when an instruction is finished being executed.

In one embodiment of the present invention, the POP 20 may perform 16 bit signed addition, subtraction, shift right operations with rounding, maximum clamping, minimum clamping and absolute value determinations. The shift right operation may round to the least significant bit. For example, if 16 bits are shifted right eight bits, then rounding occurs on the lower eight bits, affecting the upper eight bits. Rounding will not occur if rounding causes overflow or underflow of the original 16-bit signed data. The order of operations on data may be as follows: add/subtract, round/shift, max clamp/min clamp, absolute value.

A configuration register enables the absolute value function, minimum threshold and maximum threshold. Two 16-bit configuration registers store the signed maximum and minimum threshold values. These configuration registers may be changed by firmware or by instruction.

The POP 20 may use the following instruction types in one embodiment of the present invention:
TXFIFO Instruction used to send data to an external source.
INTERNAL Instruction used for routing of data.
OFFSET Instruction to add an offset to incoming data.
SHIFT RIGHT Instruction used to shift right outgoing data bits.
MAX Instruction to clamp maximum data allowed.
MIN Instruction to clamp minimum data allowed.
REPEAT_N Instruction for two types of repeat branches as described previously.
JUMP_IF Instruction for a conditional jump.
JUMP_N Instruction for the three types of jump branches.
RETURN Instruction to reset the program counter.

The following example illustrates the instruction decode in one embodiment of the present invention:

| ITYPE | note | MSB to LSB BIT MAP |
|---|---|---|
| 0000 | tx fifo | QUANTY(5)&SOURCE_GPR(5)&ITYPE(4) |
| 0001 | internal | SUBEN(1)&DEST(6)&SOURCE_B(6)& SOURCEA(6)&ITYPE (4) |
| 0010 | Offset | OFFSET(16)&ITYPE(4) |
| 0011 | Shift right | SHIFT R(4)&ITYPE(4) |
| 0100 | Max | CLAMP_MAX(16)&ITYPE(4) |
| 0101 | min | CLAMP_MIN(16)&ITYPE(4) |
| 0110 | Repeat N | REPEAT_N(5)&ITYPE(4) |
| 0111 | JumpN | JUMP_CNT(6)&INST_ADDR(7)&ITYPE(4) |
| 1000 | Return | ITYPE(4) |
| 1001 | abs_en | ABS_EN(1)&ITYPE(4) |
| 1010-1111 | reserved | |

QUANTY is a counter as defined in connection with the PIP 14. SOURCE_GPR is the start address to the GPR 16. Data of quantity N is fetched starting at the SOURCE_GPR address and automatically incremented until the quantity N has been sent to the transmit FIFO register 22. As a result, a row of N data may be sent with one instruction.

ITYPE is the instruction type as defined in the instruction decode table set forth above. OFFSET, SUBEN, SOURCE_A and SOURCE_B have the same definitions as set forth previously with respect to the PIP 14. SHIFT_R is the amount of shift rights performed on input data up to eight right shifts. The decoding is as follows: 0000 is no right shifts, 0001 is one right shift, 1000 to 1111 is eight right shifts. Rounding of the bits that fall off as a result of a shift right is also performed.

CLAMP_MAX is the maximum 16 signed value output and CLAMP_MIN is the minimum 16 bit signed output. REPEAT_N, INST_ADDR, RETURN and JUMP_CNT are as defined in connection with the PIP 14. ABS_EN is a bit that when set to one enables the absolute value function to be performed on the final output after the clamping function.

With the POP 20, data may be transferred from working registers in a programmable fashion. Data output and other slave operations may occur independently of one another. The POP 20 also allows the data to be written to a destination that may not be ready for the data. When not performing data transfers, the POP 20 can be used to perform internal math functions.

Registers 16

The registers 16 include a bus interface 34 and N general purpose registers 32 configured to allow the chaining and global chaining modes as well as independent read and write operations that can occur from a number of processors at the same time. The GPR 32 allows independent data transfers from and to any of the other processors. The GPR 32 includes registers for each of the processors that can be written to by any processor module. If two processor modules try to write to the same register, an error flag is set.

Figure 5:
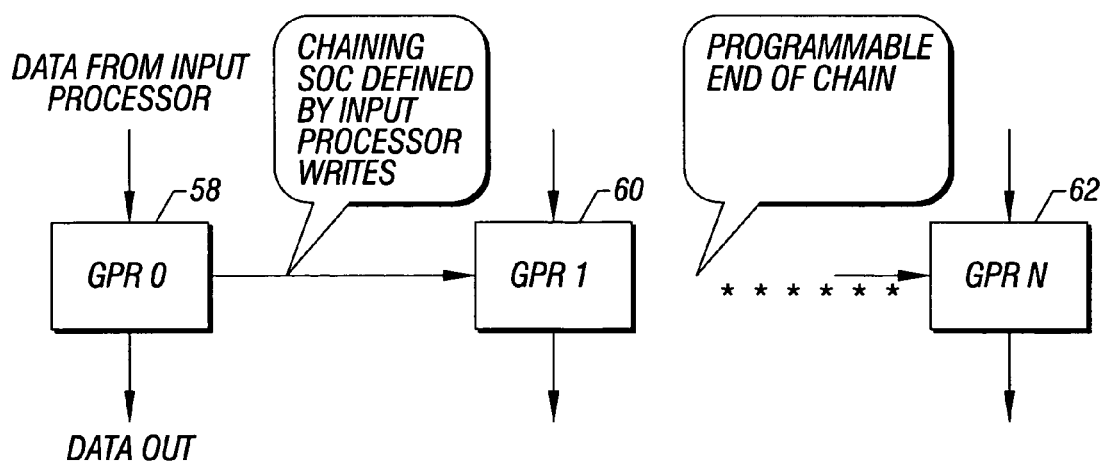
FIGS. 5 and 6 are diagrams showing the chaining process used in connection with the general purpose register shown in FIG. 1.

In chaining mode, the GPR 32 may be configured to chain one register's output to that of another register. The data written to a register 0 from the PIP 14 does not destroy data in the register 0, but instead the data from the register 0 is automatically written over to register 1 and data from the register 1 is automatically written over to the register 2 and so on in one clock cycle until a programmable EOC is reached. Thus, as shown in FIG. 5, when data is written into GPR zero indicated at 58, the data is automatically transferred to GPR one indicated as 60 and so on.

The SOC is defined as the present GPR location that the PIP 14 is writing to. This allows fast Finite Impulse Response (FIR) filters as well as fast sliding filter operations in both one and two dimensions. As an example, if SOC is set to six, a write from the PIP 14 to GPR six in this example produces no chaining. Allowing only the PIP 14 to define the SOC allows fetching of the next set of data in order while the last set is being operated on without using register to register move instructions. When contention occurs, any writes to any GPR by a processor take precedence over chaining rights from the previous register.

Figure 6:
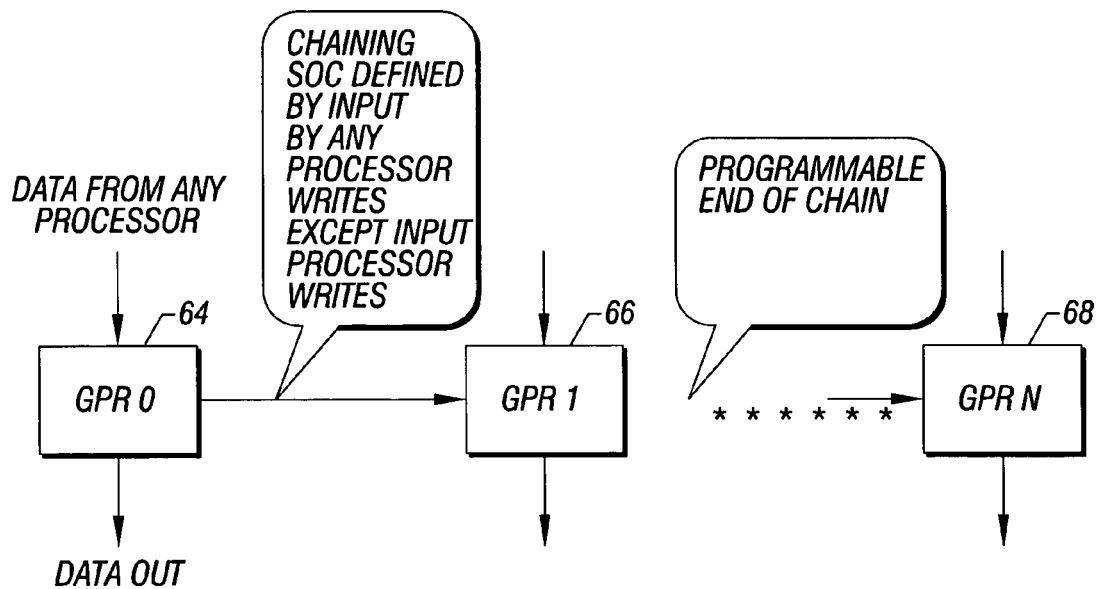

The use of a global data chaining, shown in FIG. 6, allows data to be processed more efficiently when implementing IIR filters. Global data chaining is defined as allowing internal math modules to form the SOC. This allows computed data to generate an SOC as opposed to allowing only the PIP 14 to form a data chain. In the global chaining mode, the PIP 14 cannot define the SOC. If the global chaining mode is active, then any write to a GPR from any processor except the PIP 14 can define a valid SOC. When performing IIR filtering, the SOC may be defined by other processors because the input data may be operated on before insertion into the chain. When contention occurs, any writes to the GPR by a processor take precedence over chaining rights from the previous register.

Figure 13:
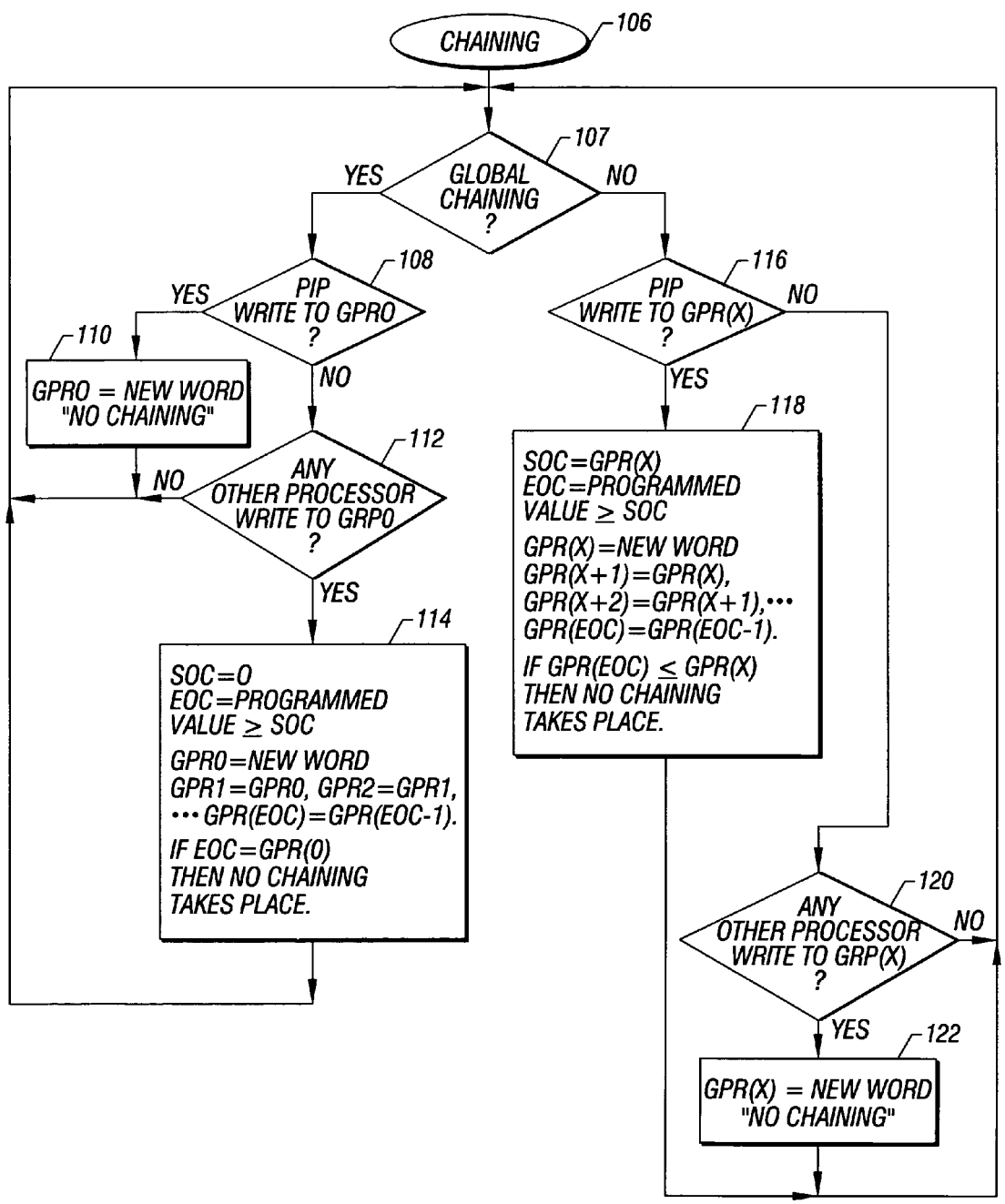
FIG. 13 is a flow chart for one embodiment of the present invention.

Referring to FIG. 13, chaining code 106, which may be stored in association with the MPC 18, begins by determining whether global chaining has been selected as indicated at diamond 107. If global chaining has been selected, a check determines whether the PIP 14 has written to a general purpose register 0 as indicated in diamond 108. If so, GPR 0 is set equal to the new word and no chaining is indicated. If the PIP did not write to GPR 0, a check at diamond 112 determines whether there is any other processor write to register GPR 0. If so, the SOC is set equal to zero and the EOC is set equal to a programmable value greater than or equal to the SOC. GPR 0 is set equal to the new word and GPR 1 is set equal to GPR 0, and GPR 2 is set equal to GPR 1, and GPR (EOC) is set equal to GPR (EOC−1) as indicated in block 114. If GPR (EOC) equals GPR 0, then no chaining takes place. A write to a GPR always occurs.

If global chaining has not been selected, then a check at diamond 116 determines whether the PIP 14 has written to a GPR register X (GPR(X)). If not, a check at diamond 120 determines whether there are any other writes to the register X. If so, the register X is set equal to the new word and no chaining occurs, as indicated in block 122.

If the PIP did write to the register GPR (X) then the SOC is set equal to the GRP(X) as indicated in block 118. The EOC is set equal to a programmable value greater than or equal to the SOC. The GPR (X) is set equal to the new word and the register GPR (X+1) is set equal to GPR (X), GPR (X+2) is set equal to GPR (X+1) and GPR (EOC) is set equal to the register GPR (EOC−1). If the register GPR (EOC) is less than or equal to the register GPR (X), then no chaining takes place but a write to GPR (X) always occurs.

The shift from one register to another may take place in one clock cycle. For example, the shift from register one to register zero, the shift from register two to register one and the shift from register three to register two and so on, all may occur in one clock cycle, in one embodiment of the present invention.

Use of chaining and global chaining modes allows independent data processing to occur in any of the processors. In addition it may allow faster IIR filters, FIR filters, sliding N dimensional filters and vector products, without the need for a large number of register to register instructions.

PRP 24

Figure 7:
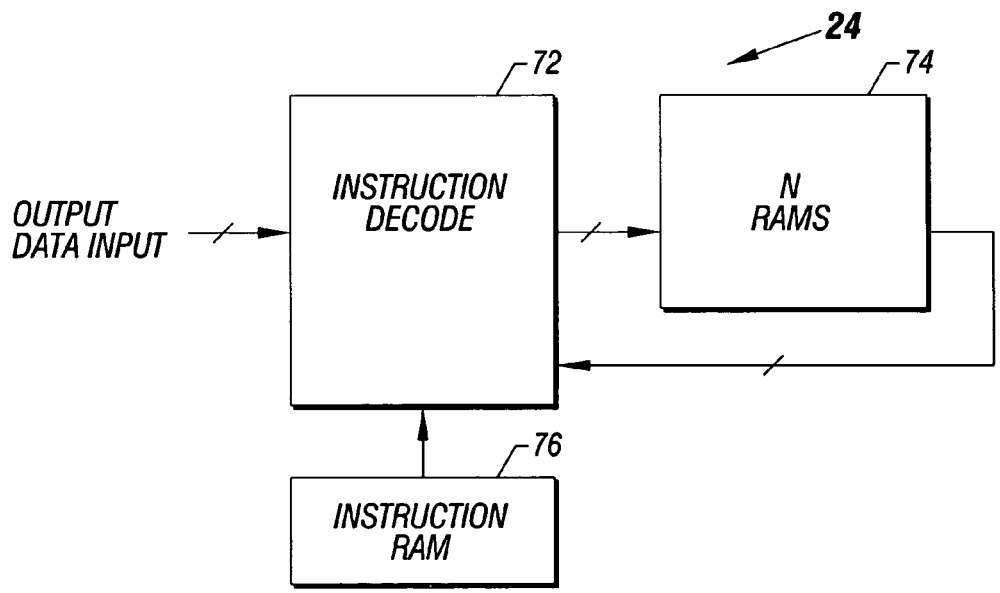
FIG. 7 is a block diagram showing one implementation of the programmable RAM processor in accordance with one embodiment of the present invention.

The PRP 24 includes a number of random access memory (RAM) modules 74, as shown in FIG. 7. The number of modules 74 equals the number of sub-processors that use the PRP 24. Thus, the N RAMs 74 are coupled to an instruction decode unit 72 which in turn is coupled to an instruction RAM 76. The N RAMs 74 can be programmed to read and write based on instructions contained in the instruction memory 76. Each RAM 74 is able to read and write independently of the others.

The PRP 24 may allow internal storage of N 16 bit data blocks in one embodiment of the invention. The PRP 24 may be used for filter operations where data is used recursively or data flow would be too restrictive on performance. An example is performing two dimensional discrete cosine transforms (DCT) where the filtering is performed on eight columns and then on eight rows. Another example is in direct storage of quantization tables and memory so that the zigzag operations and quantization may take place at the same time.

The PRP 24 may read or write to any GPR 16 register. Since the PRP 24 contains N separate memories 74, N reads or writes or a mix may take place at the same time. The firmware has direct access to all of the N RAM memories 74.

The PRP 26 may decode the following instruction types in one embodiment of the invention. A RD/WR is an instruction that provides independent read/write control of the multiple RAMs 74. A JUMPN is an instruction that provides three types of jump branches as described previously and similarly a RETURN operates as described previously in connection with other processors.

As an example of one embodiment of the invention, the following instruction decode table is provided for the PRP 24:

| ITYPE | note | MSB to LSB BITMAP |
|---|---|---|
| 00 | rd/wr | B_EN(1)&B_WREN(1)&B_ADDR(6)& B_RAMADDR(7)&A_EN(1)&A_WREN(1)& A_ADDR(6)&A_RAMADDR(7)&ITYPE(2) |
| 01 | jumpN | JUMP_CNT(6)INST_ADDR(10)&ITYPE(2) |
| 10 | return | ITYPE(2) |
| 11 | reserved | |

In the above instruction decode table, B_EN is a bit that when set to one enables a read or write from a RAM B. When set equal to zero, it disables a read or write to the RAM B. B_WREN is a bit that when set to one causes a write to RAM B if B_EN is one. When the bit B_WREN is set equal to zero, it allows a read to a RAM B if B_EN is set equal to one.

B_ADDR is the address of a destination for a RAM read and the address of the source for a RAM write. B_RAMADDR is the RAM address for a read or write. Similarly, A_EN is a bit that if set to equal to one enables a read or write from a RAM A and when set equal to zero disables a read or a write from RAM A. A_WREN, A_ADDR and A_RAMADDR are the same as B_WREN, B_ADDR or B_RAMADDR except they apply to the RAM A.

ITYPE is the instruction type defined using the two least significant bits. JUMP_CNT, INST_ADDR, and RETURN are the same as described previously in connection with other processors.

The PRP 24 allows coefficients and data to be saved in a local RAM so as to be available for data processing without reading data or coefficients from an external device. This may reduce input/output performance degradation during signal processing.

The use of a RAM to store a large number of coefficients results in the use of a smaller area than using registers. All RAM reads and writes are controlled by instructions and can operate independently of other slave processor operations, in one embodiment of the invention. This may allow faster signal processing.

PMPs 28, 30

Figure 8:
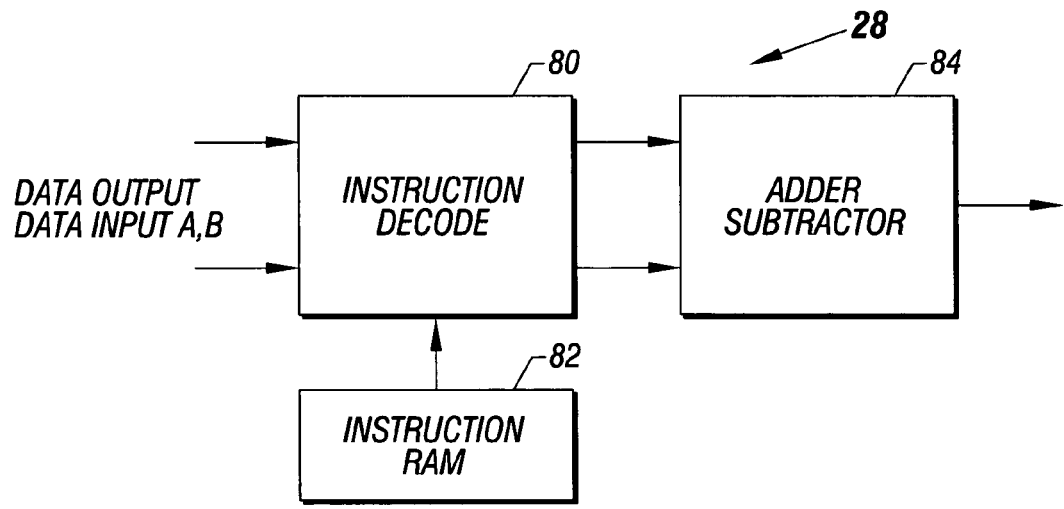
FIG. 8 is a block diagram for one embodiment of the programmable math processor, shown in FIG. 1, in accordance with one embodiment of the present invention that implements additions and subtractions.

The PMPs 28 include an instruction decode unit 80, an adder/subtractor 84 and an instruction RAM 82 as shown in FIG. 8. A PMP 28 performs addition or subtraction of two inputs and sends the result to the GPR 32. The source and destinations are defined by the instruction. The processor executes the instructions using self-timed mathematical modules.

The main function supported by a PMP 28, in one embodiment of the invention, is to add or subtract two signed 16 bit numbers and output a 16 bit signed result. The PMP 28 also has overflow and underflow flags. The PMP 28 can receive data from any of the GPR 32 registers and can provide data to any of the GPR 32 registers.

In one embodiment of the invention, the PMP 28 decodes any of the following types of instructions. An add/subtract instruction provides control of where two inputs to the adder/subtractor come from and where the result goes and whether the processor is in the add or subtract mode. The REPEAT N, JUMPN and RETURN instruction types are as described previously.

As an example of an instruction decode set for a PMP 28, the following table is provided:

| ITYPE | note | MSB to LSB BIT MAP |
|---|---|---|
| 00 | Add/sub | SUBEN(1)&DEST(6)&SOURCE_B(6)& SOURCE_A(6)&ITYPE(2) |
| 01 | RepeatN | REPEAT_N(5)&ITYPE(2) |
| 10 | jumpN | JUMP_CNT(6)&INST_ADDR(7)&ITYPE(2) |
| 11 | return | ITYPE(2) |

SUBEN, SOURCE_A, SOURCE_B, ITYPE, REPEAT_N, JUMP_CNT, INST_ADDR and RETURN are all as described previously, for example in connection with the PIP 14.

The use of a PMP 28 allows addition and subtraction operations to occur independently of other processors. Since the PMP 28 is fully modular in design, it allows scalablility of the overall digital signal processor 10.

Figure 9:
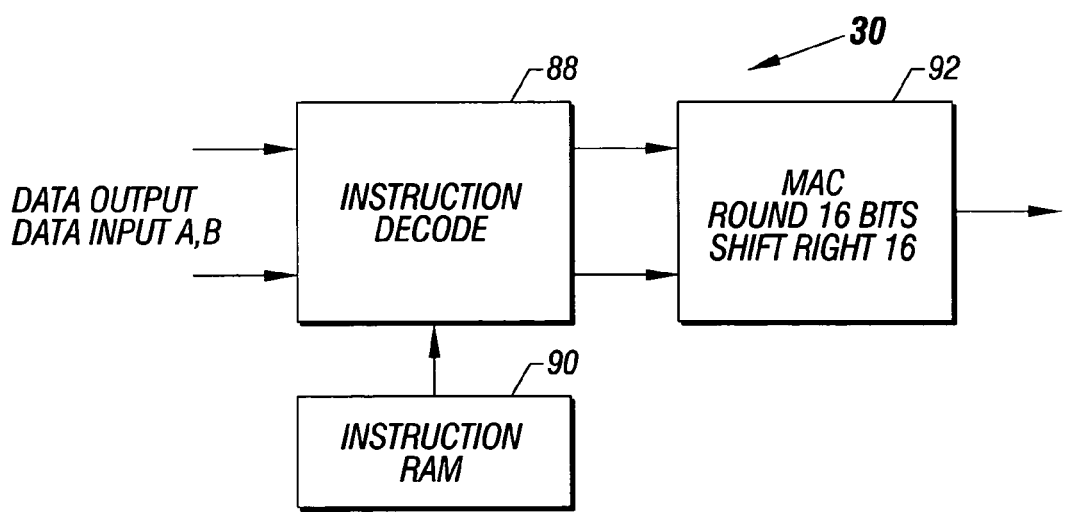
FIG. 9 is a block diagram for one embodiment of the programmable math processor, shown in FIG. 1, in accordance with one embodiment of the present invention which implements a multiply and accumulate operation.

The PMP 30 is a multiply and accumulate (MAC) processor with its own instruction memory 90, instruction decode 88, and math module 92 as shown in FIG. 9. The processor performs multiply and accumulate operations, and sends the results of its operations to a GPR 32 register. The source and destination are defined by the instruction. The processor may execute instructions using self-timed mathematical modules.

The main supported function of the PMP 30 is to multiply two signed 16 bit numbers to produce a 32 bit result. The result may be added from a previous 32 bit result to form a multiply and accumulate (MAC) function. The accumulator size is 32+N bits allowing for internal extended precision operation. The results of the accumulator are rounded to 16 bits and shifted right 16 bits to produce a signed 16 bit result.

The PMP 30 also has overflow and underflow flags. The PMP 30 may receive data from any GPR 32 and may provide data to any GPR 32.

The PMP 30 decodes the following types of instructions in one embodiment of the invention. An MAC instruction provides control of where the inputs to the multiply accumulate slave processor come from and where the results go to as well as a clear bit. REPEATN, JUMPN and RETURN are as described previously.

An example of the implementation of the above instruction types is set forth in the following instruction decode table:

| ITYPE | note | MSB to LSB BIT MAP |
|---|---|---|
| 000 | MAC | Spare(1)&CLR(1)&DEST(6)& SOURCE_B(6)&SOURCE_A(6)&ITYPE(3) |
| 001 | RepeatN | REPEAT_N(5)&ITYPE(3) |
| 010 | jumpN | JUMP_CNT(6)&INST_ADDR(7)&ITYPE(3) |
| 011 | return | ITYPE(3) |
| 100-111 | reserved | |

In the above table, CLR is a bit that when set to zero forces a feedback loop of the 32+N bit accumulator to zero. This bit is usually asserted at the beginning of a set of accumulation calculations to initialize the accumulator. If the bit is set equal to one for N multi-cycles, the MAC operates as a multiplier. DEST is the destination address of the accumulation as defined by the source and destination memory map. SOURCE_A is the address of the A input to the multiplier and SOURCE_B is the address of the B input to the multiplier.

ITYPE, REPEAT_N, JUMP_CNT, INST_ADDR, and RETURN are as described previously.

The PMP 30 allows multiply or multiply and accumulate operations to incur independently of other processors. The processor is fully modular allowing scalability of the digital signal processor 10.

Data Path Interface

Figure 10:
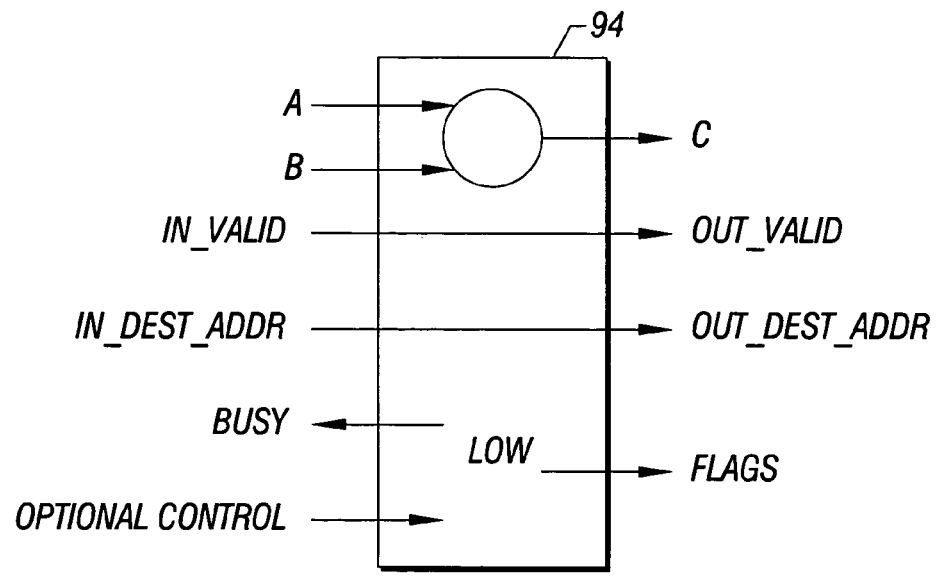
FIGS. 10, 11 and 12 show data path interface methods that may be utilized in connection with embodiments of the present invention.

Referring to FIG. 10, a data path interface method used in the digital signal processor 10, allows self-timed single cycle or multi-cycle math processors to be interchanged without affecting the instruction decode. This enables greater portability of the processor 10 to different process technologies. The interface also allows the implementation of self-timed instructions that are dependent only on math processor timing delays.

All data inputs to the arithmetic elements 94 (such as a PMP 28 or 30) are registered outputs and stable until other data values are presented. A valid input signal (IN_VALID) is provided when new data is supplied. New data is only supplied if a busy signal from an arithmetic element 94 is not asserted.

Figure 11:
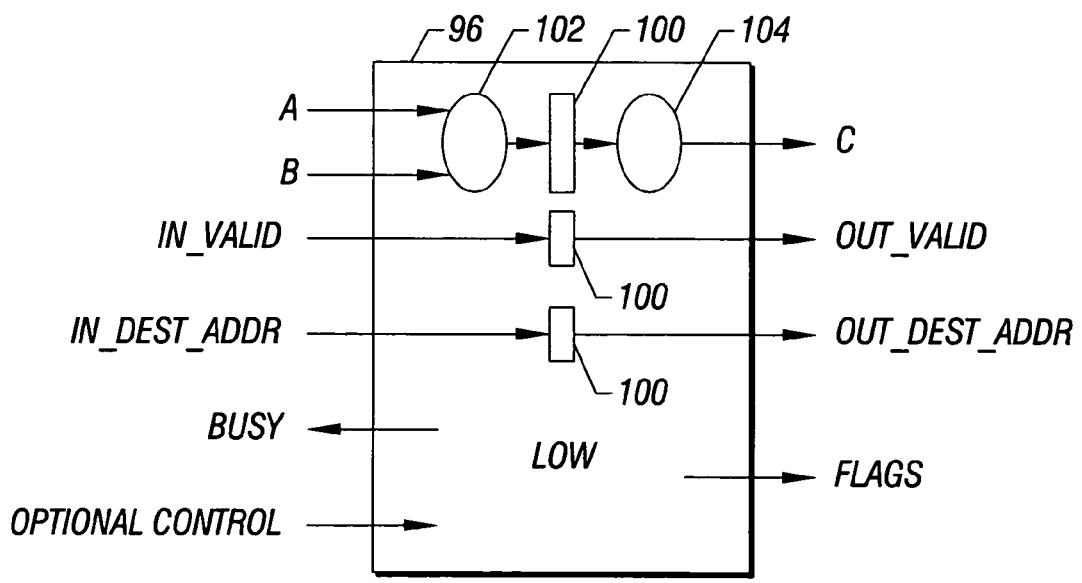

In a pipeline element 96, shown in FIG. 11, the busy signal may always be low because data can be continuously fed to the arithmetic element 96. A delay element 100 may be used to delay the operation of the arithmetic element by as much as one clock cycle. For example, the math processor may be divided into units 102 and 104 with a delay element 100 in between. Similarly, the input valid signal (IN_VALID) may be delayed by one cycle delaying the output valid (OUT_VALID) by one cycle. Likewise, the data direction signal (IN_DEST_ADDR), which tells where the data may go, may be delayed.

Figure 12:
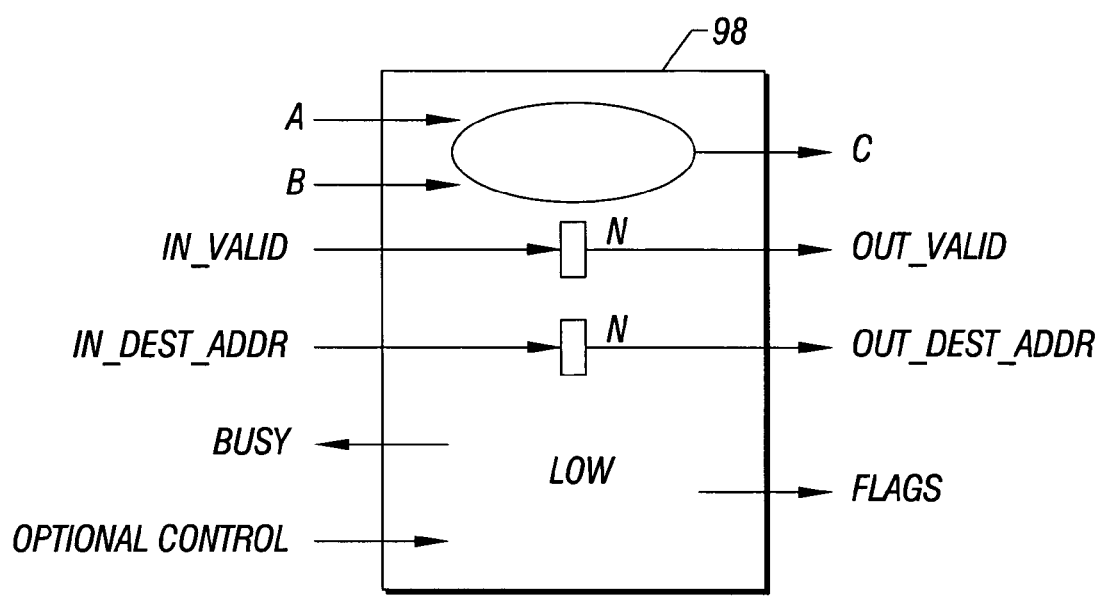

In a multi-cycle arithmetic element 98, shown in FIG. 12, the busy signal can be used to hold off new data from being sourced to the arithmetic element 98. Destination addresses for the result of the mathematical operation and mode change signals may be supplied to the arithmetic element 98 to help stabilize it until new data is present.

The arithmetic element 98 provides internal delays to match the latency of the arithmetic such that multi-cycle operation occurs. The operation may be spread over two or more clock cycles. The input data valid (IN_VALID) and input destination (IN_DEST_ADDR) signals may also be delayed the needed number of cycles (N). Error flag signals are provided and registered by the arithmetic element. The input data valid signal to qualify the input data, and the mode or control signals to the arithmetic element 98 are asserted for new data sent to the arithmetic element.

These interface methods allow a digital signal processor to transcend different process technologies. In some cases the sole redesign needed for a new function may be to redesign the math modules. Instructions set in instruction decode logic need not be changed to accommodate different arithmetic element timing changes. This allows a more portable design amenable to different process technology changes.

Through the use of pipelined or multi-cycled processes, different mathematical processors may be added to the overall processor regardless of whether they require more or less time than the processor which they replace. Thus, in cases where a slower math processor is replacing a faster math processor, a pipelined or a multi-cycled architecture may be utilized to compensate for the additional delay time. Conversely, if the new math processor is faster than the one which it replaces, the faster math processor may be used without change except as described hereinafter.

In each case, the MPC 18 is recompiled to adjust to the slower or faster timing of a new math processor. Regardless of whether the new timing is longer or shorter, all that is needed is to recompile the MPC 18. The MPC 18 then operates with the new timing. Thus, the system may be easily and quickly adapted to new processors which are made on different process technologies and which may be faster or slower than the processor for which the system was originally designed.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A digital signal processor comprising:
a programmable, multiply and accumulate mathematical processor;
an input processor to process input signals received from a receive buffer coupled to said input processor;
an output processor to process output signals to be output via a transmit buffer coupled to said output processor;
a master processor to control said mathematical processor, said input processor and said output processor, and to provide timing for the other processors; and
a storage to store data from each of said processors so as to be accessible by each of said processors, said storage including a plurality of registers, including a first register to transfer existing data from said first register to a second register when new data is written into said first register.

2. The digital signal processor of claim 1 further including a random access memory processor to store intermediate calculation results.

3. The digital signal processor of claim 2 including a bus coupling each of said processors to said storage.

4. The digital signal processor of claim 1 wherein said input and output processors also implement mathematical operations.

5. The digital signal processor of claim 1 wherein said processors are to communicate with one another through said storage.

6. The digital signal processor of claim 1 wherein each of said processors to use very long instruction words.

7. The digital signal processor of claim 1 wherein said master processor is to wait for the input processor to complete a given operation.

8. The digital signal processor of claim 1 wherein each of said processors includes its own random access memory.

9. The digital signal processor of claim 1 wherein said input processor is to cause the automatic transfer of data.

10. The digital signal processor of claim 1 wherein said mathematical processor is to cause said data to be transferred from one register to another.

11. The digital signal processor of claim 1 wherein said mathematical processor which is pipelined.

12. The digital signal process of claim 1 wherein said mathematical processor is a multi-cycled mathematical processor.

13. A method of digital signal processing comprising:
using a first processor to process input signals received from a receive buffer coupled to said first processor;
using a second processor to process output signals to be output via a transmit buffer coupled to said second processor;
using a third processor for multiply and accumulate operations;
controlling said first, second and third processors using a fourth processor;
storing data from one of said processors in a first register, transferring a prior value stored in said first register into a second register, and transferring a prior value stored in said second register into a third register, when an end of chain value is greater than a start of chain value;
providing timing from said fourth processor for each of the other processors.

14. The method of claim 13 including automatically transferring said prior value from said first register of a storage to a second register of said storage when said data is being written into said first register.

15. The method of claim 14 including automatically transferring said prior value in response to action by said first processor.

16. The method of claim 14 including automatically transferring said prior value in response to action by said third processor.

17. The method of claim 14 including storing a bit which indicates which processor may control said automatic transfer of data from one register to another.

18. The method of claim 13 including accommodating for timing differences between said processors by operating one of said processor in a pipelined fashion.

19. The method of claim 13 including accommodating differences in processing cycle time of one of said processors by operating said processor in a multi-cycle mode.

20. The method of claim 19 including holding off said fourth processor when one of said processors is taking more than a cycle to complete an instruction.

21. The digital signal processor of claim 1 wherein each of said processors has a different instruction set than the other processors.

22. The digital signal processor of claim 1 wherein said first register is to transfer said existing data and write said new data in a single clock signal, and said second register is to transfer a second existing data to a third register in said single clock cycle.

23. The digital signal processor of claim 1 wherein said transfer of said existing data is performed without execution of a register to register move instruction.

24. The method of claim 13 including providing each of said processors with a different instruction set than the other processors.

25. The method of claim 13 including performing the transferring by each of said registers in a single cycle.

26. The method of claim 13 including transferring said prior value without execution of a register to register move instruction.

* * * * *